(12) United States Patent
Gattiglio et al.

US007910857B2

(10) Patent No.: US 7,910,857 B2
(45) Date of Patent: Mar. 22, 2011

(54) LASER MACHINE TOOL

(75) Inventors: Maurizio Gattiglio, Turin (IT); Franco Sartorio, Turin (IT); Michele de Chirico, Alpignano (IT)

(73) Assignee: Prima Industrie S.p.A., Collegno (Torino) (IT)

( * ) Notice: Subject to any disclaimer, the term of this patent is extended or adjusted under 35 U.S.C. 154(b) by 664 days.

(21) Appl. No.: 11/813,901

(22) PCT Filed: Dec. 8, 2005

(86) PCT No.: PCT/IB2005/003813
§ 371 (c)(1),
(2), (4) Date: Mar. 27, 2008

(87) PCT Pub. No.: WO2006/075209
PCT Pub. Date: Jul. 20, 2006

(65) Prior Publication Data
US 2008/0197118 A1    Aug. 21, 2008

(30) Foreign Application Priority Data
Jan. 13, 2005   (IT) .............. TO2005A0016

(51) Int. Cl.
*B23K 26/08* (2006.01)
*B23C 1/01* (2006.01)
*B23K 26/00* (2006.01)
(52) U.S. Cl. ............ 219/121.78; 219/121.84; 409/202
(58) Field of Classification Search ............ 219/121.78, 219/121.82, 121.84; 409/190, 202, 235, 409/236
See application file for complete search history.

(56) References Cited

U.S. PATENT DOCUMENTS

| 5,109,148 A  * | 4/1992 | Fujita et al. ............. 219/121.82 |
| 5,481,083 A  * | 1/1996 | Smyth, Jr. ................ 219/121.67 |
| 5,500,507 A  * | 3/1996 | Yoshiaki .................. 219/121.82 |
| 5,910,260 A | 6/1999 | Gerber |
| 5,925,268 A  * | 7/1999 | Britnell .................... 219/121.63 |
| 6,186,024 B1 * | 2/2001 | Leiber ......................... 74/490.09 |
| 6,241,437 B1 * | 6/2001 | Wieland ....................... 409/201 |
| 2004/0025761 A1 | 2/2004 | Sartorio |

FOREIGN PATENT DOCUMENTS

| CA | 1158084 A | * 12/1983 |
| EP | 0917004 A |   5/1999 |
| FR | 2850599 A |   8/2004 |
| JP | 62068208 A |   3/1987 |
| JP | 10272570 A | * 10/1998 |
| JP | 2002001629 A |  1/2002 |
| SU | 1011442 | * 4/1983 |

OTHER PUBLICATIONS

International Search Report for International Application No. PCT/IB2005/003813, dated Jun. 29, 2006.

* cited by examiner

*Primary Examiner* — Geoffrey S. Evans
*Assistant Examiner* — Mark Woodall
(74) *Attorney, Agent, or Firm* — Heslin Rothenberg Farley & Mesiti P.C.; Victor A. Cardona, Esq.

(57) ABSTRACT

A laser machine tool for carrying out cutting or welding operations includes a laser head carried by a moving member which is displaceable with respect to a workpiece along two horizontal cartesian axes in a relatively wide space with movements involving relatively low accelerations. The laser head is displaceable on the moving member, along a pair of horizontal cartesian axes in a relatively restricted space with high speeds and accelerations, via a pair of slides to which respective balancing weights are operatively associated.

15 Claims, 5 Drawing Sheets

LASER MACHINE TOOL

CROSS REFERENCE TO RELATED APPLICATIONS

This application is a national stage of PCT International Application No. PCT/IB2005/003813, filed on Dec. 8, 2005, and published in English on Jul. 20, 2006, as WO 2006/075209 A2, which claims priority to Italian Patent Application No. TO2005A000016 filed Jan. 13, 2005, the entire disclosures of which are incorporated herein by reference.

FIELD OF THE INVENTION

The present invention relates in general to laser machine tools, in particular for carrying out cuts or welds on metal sheets.

More in particular, the invention relates to a laser machine tool of the type comprising a supporting structure, beneath which a workpiece is horizontally positionable, and a mobile assembly carried by said supporting structure and bearing a vertical-axis laser head designed for directing a laser beam focused on said workpiece.

SUMMARY OF THE INVENTION

The object of the invention is to provide a laser machine tool suitable for working on workpieces even of large dimensions in an extremely fast and precise way, with relatively limited overall dimensions and with vibrations of the mobile assembly bearing the laser head that are appreciably reduced given an extreme rapidity of operation thereof.

According to the invention, this object is achieved thanks to a laser machine tool of the type defined above, mainly characterized in that:
- the moving member includes a first slide and a second slide, which can be linearly displaced along a pair of mutually orthogonal horizontal cartesian axes, said slides having respective slide guides, which are directed orthogonally to the corresponding axes of displacement and along which the laser head is mobile, whereby the displacement of each slide along the corresponding cartesian axis produces a corresponding displacement of the laser head with respect to the other slide; first and second actuator means being provided for controlling the displacements, respectively, of said first and second slides, i.e., of said laser head, in a relatively restricted space and with high speeds and accelerations; and
- balancing means with mobile balancing weights being operatively associated to said first and second slides;
- the moving member is displaceable on said supporting structure along a first horizontal cartesian axis with movements involving relatively low accelerations;
- the supporting structure and the workpiece are displaceable with respect to one another along a second horizontal cartesian axis, orthogonal to said first cartesian axis, with movements involving relatively low accelerations, whereby said moving member and said workpiece are positionable with respect to one another in a relatively wide space and in a co-ordinated way with said displacements of said laser head in a relatively restricted space.

In a first embodiment of the invention, the supporting structure is displaceable along said second horizontal cartesian axis whilst the workpiece is stationary.

In a second embodiment of the invention, the supporting structure is stationary whilst the workpiece is displaceable along said second horizontal cartesian axis.

The laser machine tool according to the invention, as already mentioned, is particularly designed for carrying out cuts or welds on metal sheets and is able to work with extreme precision and rapidity within useful volumes that may even be considerable thanks to the co-ordination between, on the one hand, the displacements of the entire moving member in a relatively wide space with movements involving relatively low accelerations and, on the other, the displacements of the two slides of the moving member, and hence of the laser head, in restricted spaces with movements at high speeds and accelerations. The presence of the balancing weights operatively associated to the two slides of the moving member enables, notwithstanding the extremely high dynamic performance of the laser head, a drastic reduction in the transmission of undesirable vibrations from the moving member to the supporting structure of the machine.

The use of mobile balancing weights, operatively associated to the slides of a moving member bearing a laser-cutting head in a punching press for the execution of holes in metal sheets, is described and illustrated in the Italian patent application No. TO2004A00647, filed in the name of the present applicant and not published at the date of priority of the present application.

BRIEF DESCRIPTION OF THE DRAWINGS

The invention will now be described in detail with reference to the annexed plate of drawings, which are provided purely by of way of non-limiting example and in which.

DETAILED DESCRIPTION OF THE INVENTION

Figure 1:
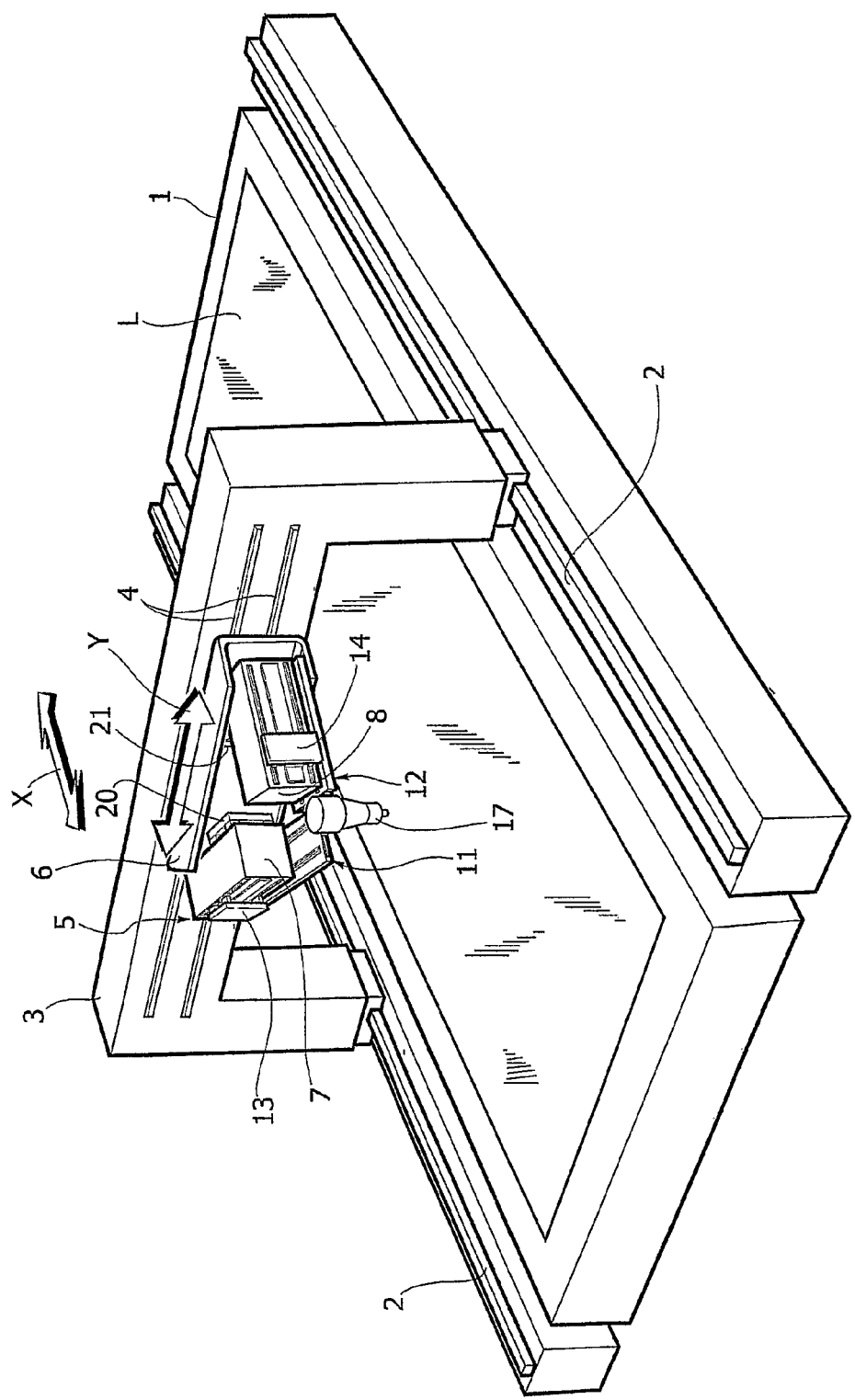
FIG. 1 is a schematic perspective view of a laser machine tool according to a first embodiment of the invention.
Figure 2:
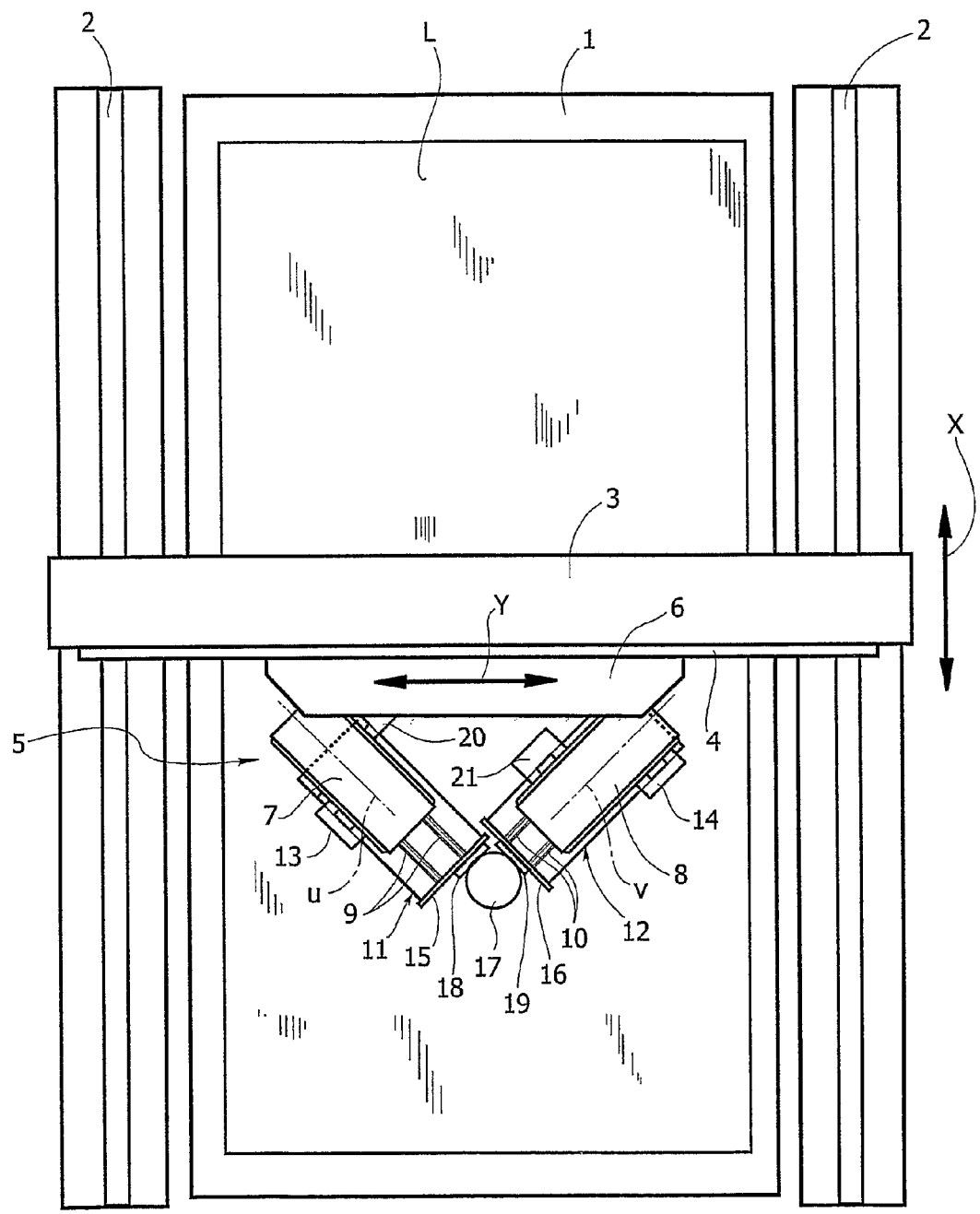
FIG. 2 is a top plan view at an enlarged scale of the laser machine tool of FIG. 1.

With initial reference to FIGS. 1 and 2, the laser machine tool according to a first embodiment of the invention basically comprises a horizontal machine base 1, on which a workpiece is positioned horizontally, typically a metal sheet L even of large dimensions, and along two opposite sides of which there extend two longitudinal guides 2 for a supporting structure 3. The supporting structure 3 has, for example, a general portal configuration extending transversely with respect to the machine base 1 and is displaceable linearly along the guides 2 along a first horizontal cartesian axis X. The displacements of the supporting structure 3 with respect to the machine base 1 in the direction of the axis X are obtained, by means of actuator assemblies (which are generally conventional and not illustrated in the drawings in so far as they are within the reach of any person skilled in the branch), with movements characterized by relatively low accelerations and speeds, substantially throughout the longitudinal extension of the machine base 1.

The supporting structure 3 in turn bears slide guides 4 arranged according to a horizontal cartesian axis Y orthogonal to the axis X, along which a moving member designated as a whole by 5 can be translated. The linear displacements of the moving member 5 along the axis Y are also obtained with movements involving relatively low accelerations, substantially throughout the transverse extension of the machine base 1, by means of motor-driven actuators, which are also conventional and not visible in the drawings in so far as they also are within the reach of a person skilled in the branch.

The moving member 5 comprises a slide 6, which can move along the guides 4 above the workpiece L and bears a pair of guide blocks 7, 8 arranged horizontally and, with respect to the supporting structure 3, according to a generally V-shaped configuration. The guide blocks 7, 8 are provided, at the bottom, with respective slide guides (not illustrated), along which shoes 9, 10, carried respectively by a first slide 11 and by a second slide 12, engage in a sidable way.

The slides 11, 12 can be linearly displaced with respect to the corresponding blocks 7, 8 along two mutually orthogonal horizontal cartesian axes, designated, respectively, by u and v. The displacement of each slide 11, 12 is obtained via a respective actuator 13, 14, constituted, for example, by a linear or else rotary electric motor with external-thread/internal-thread transmission or the like.

To enable partial superposition between the slides 11, 12 during their displacements along the respective axes u and v, said slides 11, 12 are vertically slightly staggered with respect to one another.

Figure 5:
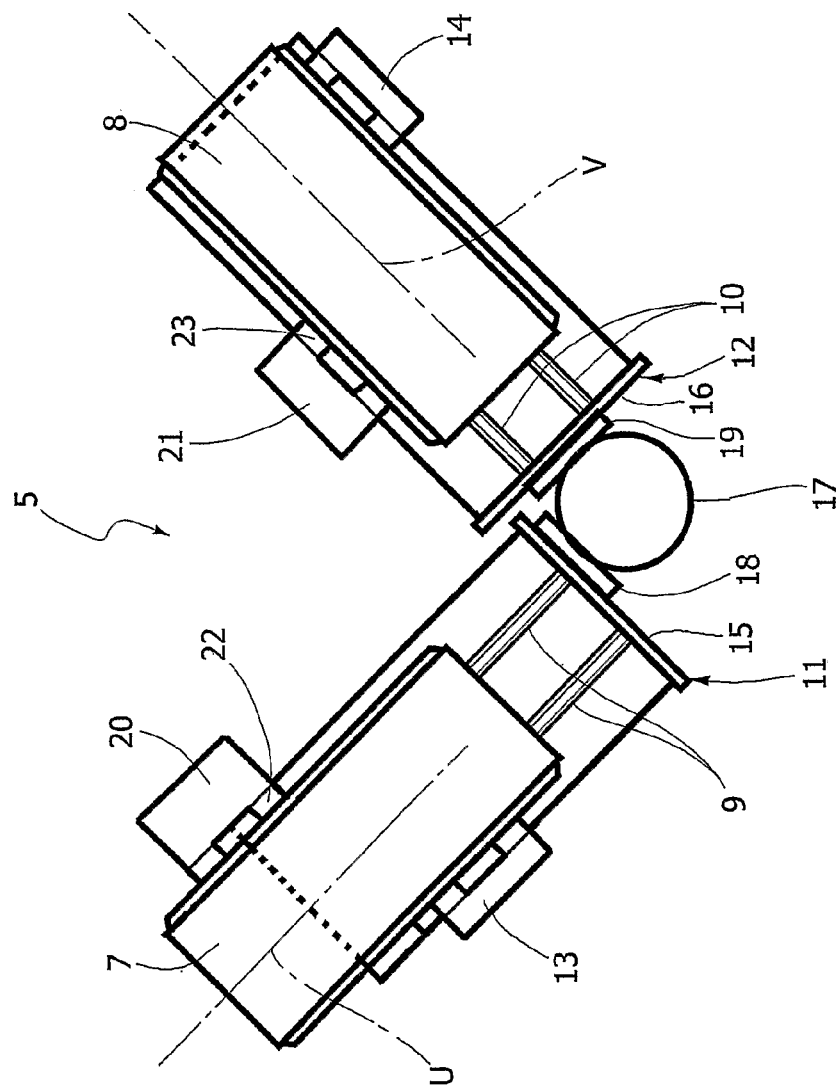
FIG. 5 is a partial top plan view at an enlarged scale of the moving member of the machine.

As may be seen more clearly from FIG. 5, two slides 11, 12 bear, at the respective front sides, respective guides 15, 16, on which there can slide a vertical-axis laser-cutting head 17, equipped, in a way generally in itself known, with an optical system (for example, a reflection system or an optical-fibre system) for focusing a laser beam, emitted by a laser source, on the workpiece L. The laser source and the focusing system are not illustrated, for reasons of brevity, in so far as they are conventional and within the reach of a person skilled in the branch.

The laser head 17 is equipped with a pair of lateral sliders 18 and 19, for example constituted by shoes or carriages, which are mobile along the front guides 15 and 16 of the slides 11 and 12.

The motors 13 and 14 are operatively connected to a numerical-control unit (not illustrated nor described in detail herein in so far as it also is within the reach of a person skilled in the branch), which controls their operation in accordance with pre-set programs according to the requirements for processing of the workpiece L, and in a co-ordinated way with the actuators that control the displacements of the moving member 5 along the guides 4 in the direction of the axis Y, as well as with the actuators that control the displacements of the supporting structure 3 in the direction of the axis X. Said programs will be prearranged for moving the laser head 18 along the axes u and v in a substantially continuous way, within a relatively restricted space and with extremely high speeds and accelerations, whilst the displacements of the moving member 5 along the axis Y and the displacements of the supporting structure 3 in the direction of the axis X are obtained with relatively low movements and accelerations, in a relatively wide space.

Generally high levels of vibrations transmitted by the moving member 5 to the supporting structure 3 of the machine would correspond to high accelerations of the laser head 17. In order to achieve a drastic reduction in said vibrations to practically negligible values, the invention envisages the presence of a system of balancing with mobile balancing weights operatively associated to the slides 11 and 12. In the case of the example illustrated, said mobile balancing weights are designated by 20, 21 and are displaceable, via respective actuators 22, 23 (similar to the actuators 13, 14) each in a direction opposite to the direction of displacement of the corresponding slide 11, 12 along the axis u or, respectively, v, with equal speed and acceleration. In other words, when, for example, the slide 11 is made to advance for moving the laser head 17 along the axis u, the corresponding balancing weight 20 is made to recede parallel to the axis u as has been said, with equal speed and acceleration.

Also the actuators 20 and 21 are operatively connected to the programmable control unit of the machine so that all the moving weights during processing of the workpiece L are coordinated to guarantee the continuity of movement.

It should be noted that the laser head 17, or part thereof, may also be displaceable along a vertical axis, by means of a suitable motor-driven actuator, which is also connected to the control unit of the machine.

It should moreover be noted that the position and configuration of the balancing weights 20 and 21 could vary with respect to the ones illustrated: for example, they may be carried in cantilever fashion by respective arms extending underneath the slides 11 and 12, each in a direction orthogonal to that of displacement of the corresponding slide.

Figure 3:
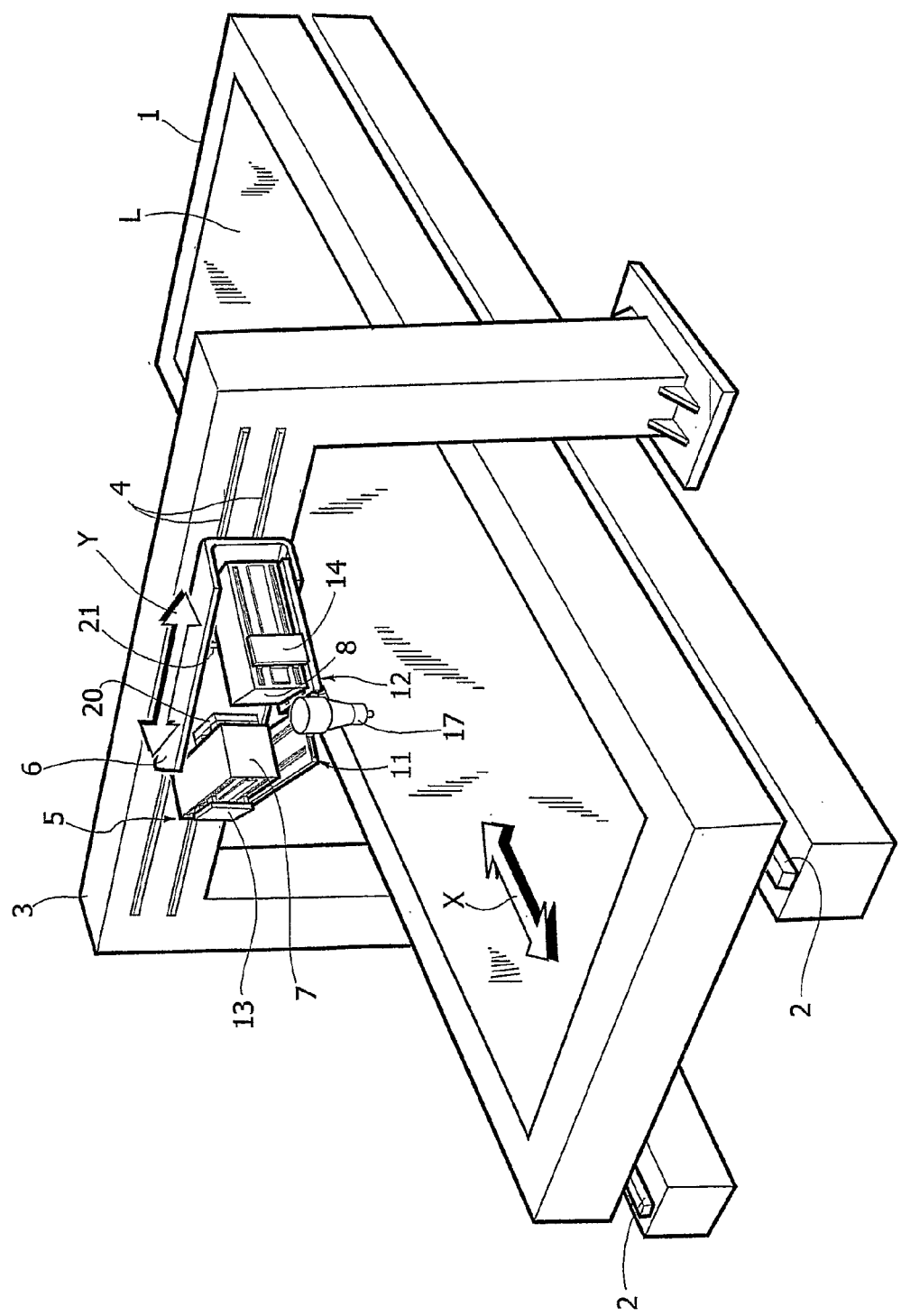
FIG. 3 is a schematic perspective view of a laser machine tool according to a second embodiment of the invention.
Figure 4:
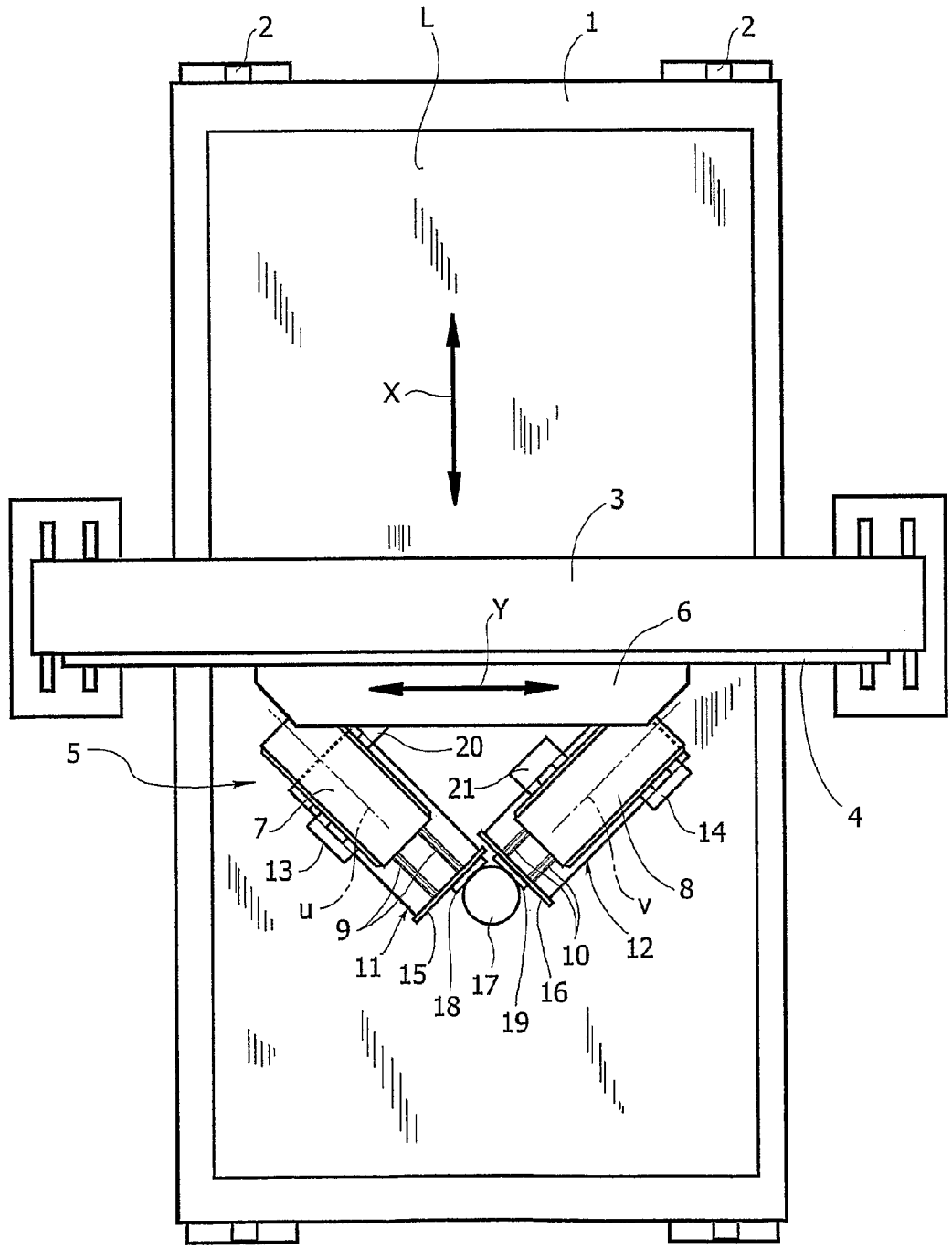
FIG. 4 is a top plan view at an enlarged scale of laser machine tool of FIG. 3.

The variant represented in FIGS. 2 and 3 is generally similar to the embodiment described previously with reference to FIGS. 1 and 2, and in what follows only the differences will be described in detail, the same reference numbers being used for the parts that are identical or similar.

Said variant consists in a so-to-speak "hybrid" solution, in which the relative movement between the moving member 5 and the workpiece L is obtained by moving the workpiece L, instead of by translating the supporting structure 3. In said variant, then, the supporting structure 3 is fixed whereas the machine base 1 (or a part thereof, on which the workpiece L rests) is slidably mounted along the axis X on the longitudinal guides 2.

The logic of operation of this variant is altogether similar to that of the preceding embodiment: also in this case the laser head 17 is moved along the axes u and v within a relatively restricted space with high speeds and accelerations, whilst the displacements, respectively, of the moving member 5 along the axis Y and of the workpiece L along the axis X are effected with movements involving relatively low accelerations in a wide space and such as to cover the entire extension of the workpiece L.

Of course the details of construction and the embodiments may vary widely with respect to what is described and illustrated herein, without thereby departing from the scope of the present invention, as defined in the ensuing claims.

The invention claimed is:
1. A laser machine tool, in particular for carrying out cutting or welding operations, comprising:
   a supporting structure, beneath which a workpiece is horizontally positionable, and a moving member, carried by said supporting structure and bearing a vertical-axis laser head, designed for directing a laser beam focused on said workpiece,
   said moving member comprising:
   a first slide and a second slide, which can be linearly displaced along a u-axis and a v-axis, the u-axis and v-axis being a pair of mutually orthogonal horizontal slide cartesian axes, said first slide and said second slide connected to respective slide guides of respective slide blocks, which are directed orthogonally to the respective axes of displacement and along which said laser head is mobile, only one end of each of said respective slide blocks being connected to said supporting structure, whereby the displacement of each slide of said first slide and said second slide along the corresponding cartesian u-axis and v-axis produces a corresponding displacement of the laser head with respect to another slide of said first slide and said second slide;

first and second actuator means for controlling the displacements of said first slide and said second slide, in a relatively restricted space and with high speeds and accelerations; and balancing means with mobile balancing weights being operatively associated to said first slide and said second slide;

said moving member displaceable on said supporting structure along a horizontal cartesian y-axis with movements involving relatively low accelerations; and said supporting structure and said workpiece displaceable with respect to one another along a horizontal cartesian x-axis, orthogonal to said horizontal cartesian y-axis, with movements involving relatively low accelerations, whereby said moving member and said workpiece are positionable with respect to one another in a relatively wide space and in a co-ordinated way with said displacements of said laser head in a relatively restricted space;

wherein neither the u-axis nor the v-axis is parallel to the v-axis.

2. The laser machine tool according to claim 1, wherein said supporting structure is displaceable along said horizontal cartesian x-axis while the workpiece is stationary.

3. The laser machine tool according to claim 2, wherein each of said first and second slides comprises a respective balancing weight of said mobile balancing weights, said respective balancing weight displaceable linearly, via respective actuator means, in a direction opposite to the direction of displacement of the corresponding slide with equal speeds and accelerations.

4. The laser machine tool according to claim 2, wherein said first and second slides are vertically staggered with respect to one another.

5. The laser machine tool according to claim 2, wherein said first and second actuators for controlling the displacements of said first and second slides and said actuator means for controlling the displacements of said balancing weights include electric motors controlled electronically in a coordinated way with the displacements along said horizontal cartesian x-axis and said horizontal cartesian y-axis.

6. The laser machine tool according to claim 1, wherein said supporting structure is stationary while said workpiece is displaceable along said horizontal cartesian x-axis.

7. The laser machine tool according claim 6, wherein each of said first and second slides comprises a respective balancing weight of said mobile balancing weights, said respective balancing weight displaceable linearly, via respective actuator means, in a direction opposite to the direction of displacement of the corresponding slide with equal speeds and accelerations.

8. The laser machine tool according to claim 6, wherein said first and second slides are vertically staggered with respect to one another.

9. The laser machine tool according to claim 6, wherein said first and second actuators for controlling the displacements of said first and second slides and said actuator means for controlling the displacements of said balancing weights include electric motors controlled electronically in a coordinated way with the displacements along said horizontal cartesian x-axis and said horizontal cartesian y-axis.

10. The laser machine tool according to claim 1, wherein each of said first slide and said second slide comprises a respective balancing weight of said mobile balancing weights, said respective balancing weight displaceable linearly, via respective actuator means, in a direction opposite to the direction of displacement of the corresponding slide with equal speeds and accelerations.

11. The laser machine tool according to claim 10, wherein said first and second slides are vertically staggered with respect to one another.

12. The laser machine tool according to claim 10, wherein said first and second actuators for controlling the displacements of said first and second slides and said actuator means for controlling the displacements of said balancing weights include electric motors controlled electronically in a coordinated way with the displacements along said horizontal cartesian x-axis and said horizontal cartesian y-axis.

13. The laser machine tool according to claim 1, wherein said first slide and said second slide are vertically staggered with respect to one another.

14. The laser machine tool according to claim 13, wherein said first and second actuators for controlling the displacements of said first and second slides and said actuator means for controlling the displacements of said balancing weights include electric motors controlled electronically in a coordinated way with the displacements along said horizontal cartesian x-axis and said horizontal cartesian y-axis.

15. The laser machine tool according to claim 1 wherein said first and second actuators for controlling the displacements of said first and second slides and said actuator means for controlling the displacements of said balancing weights include electric motors controlled electronically in a coordinated way with the displacements along said horizontal cartesian x-axis and said horizontal cartesian y-axis.

* * * * *